Patented Dec. 29, 1925.

1,567,445

UNITED STATES PATENT OFFICE.

SIMON J. LUBOWSKY, OF JERSEY CITY, NEW JERSEY, ASSIGNOR TO METAL & THERMIT CORPORATION, OF CHROME, NEW JERSEY, A CORPORATION OF NEW JERSEY.

REFRACTORY MATERIAL, ARTICLES MADE THEREFROM, AND METHOD OF MAKING THE SAME.

No Drawing.   Application filed December 18, 1922. Serial No. 607,726.

*To all whom it may concern:*

Be it known that I, SIMON J. LUBOWSKY, a citizen of the United States, and a resident of Jersey City, in the county of Hudson and State of New Jersey, have invented a certain new and useful Refractory Material, Articles Made Therefrom, and Method of Making the Same; and I do hereby declare the following to be a full, clear, and exact description of the invention, such as will enable others skilled in the art to which it appertains to make and use the same.

The invention relates to a new and useful refractory, chemical resisting material, consisting essentially of rutile or titanium dioxide, articles made therefrom, and the method of making such articles.

In carrying out the invention, the rutile, which is a natural product, is ground to a suitable degree of fineness and formed into shaped articles by any of the well-known methods and subsequently calcined or burned at a high temperature. On heating, the ground material gradually changes color from light brown to dark brown, dark red, or purple, assumes a very pronounced crystalline appearance and finally at a temperature of over 800° C., sinters and forms a homogeneous coherent mass of remarkable strength, hardness, refractivity and resistivity to chemical agents. By application of a higher heat, a distinct glaze may be obtained for the entire superficial surface or surfaces of the article. In forming this material into the shaped articles, it may in certain cases be found advantageous to use mixtures of relatively coarse particles and finer particles, and in other cases to use all fine materials. Certain of these mixtures of particles can be readily formed into the shapes by pressure alone, others with water as a binder, and still others with such temporary binders as clay, alumina, sodium silicate, bentonite, starch, gum, or the like, which will impart the necessary strength to the preliminarily molded articles and insure the retention of the desired form thereof during the calcining operations.

The invention finds a wide application in the manufacture of bricks and lining materials for furnaces and pots employed in the glass industry, the metal working industry, and other arts where refractibility and resistance to chemical action are required. The product also is particularly well adapted for the manufacture of crucibles, muffles, and similar apparatus to be subjected to heat, and the action of various chemicals, and when so employed is capable of long and continued use without material deterioration or impairment.

Obviously, satisfactory results may be obtained by mixing other refractory materials, such, for example, as zirkite, with the rutile, and forming and molding the mixture into the desired shapes with or without the use of a binder, and it is to be understood that the invention as claimed contemplates the use of the material and the articles made therefrom, in which the rutile predominates or constitutes the dominating element.

What I claim is:

1. A material for use in making refractory, chemical resisting articles comprising calcined rutile with the particles in sintered union.

2. The method of making refractory, chemical resisting articles which comprises grinding rutile, forming the ground rutile to the desired shape, and heating the formed article until it sinters into a homogeneous, coherent mass.

3. The method of making refractory, chemical resisting articles which comprises grinding rutile, forming the ground rutile to the desired shape, and heating the formed article to a temperature of at least 800° C.

4. The method of making refractory, chemical resisting articles which comprises preparing a moist mixture or paste of comminuted rutile and water, molding the mixture to the desired form, and heating the molded article until it sinters into a homogeneous coherent mass.

5. The method of making refractory, chemical resisting articles which comprises preparing a moist mixture or paste of comminuted rutile and water, molding the mixture to the desired form, and heating the molded article to a temperature of at least 800° C.

6. A shaped refractory chemical resisting article formed of ground and calcined rutile.

7. A shaped refractory chemical resisting article formed of a burned paste of rutile.

8. A shaped refractory chemical resisting article formed of a burned paste of rutile and a binder.

In testimony whereof I affix my signature.

SIMON J. LUBOWSKY.